US 11,792,197 B1

United States Patent
Yu et al.

(10) Patent No.: US 11,792,197 B1
(45) Date of Patent: Oct. 17, 2023

(54) DETECTING MALICIOUS USER ACCOUNTS OF AN ONLINE SERVICE USING MAJOR-KEY-SHARED-BASED CORRELATION

(71) Applicant: DataVisor, Inc., Mountain View, CA (US)

(72) Inventors: Fang Yu, Sunnyvale, CA (US); Olivia Wang, Fremont, CA (US)

(73) Assignee: DataVisor, Inc., Mountain View, CA (US)

( * ) Notice: Subject to any disclaimer, the term of this patent is extended or adjusted under 35 U.S.C. 154(b) by 556 days.

(21) Appl. No.: 16/794,139

(22) Filed: Feb. 18, 2020

Related U.S. Application Data

(60) Provisional application No. 62/806,314, filed on Feb. 15, 2019.

(51) Int. Cl.
*H04L 9/40* (2022.01)

(52) U.S. Cl.
CPC .......... *H04L 63/102* (2013.01); *H04L 63/0435* (2013.01); *H04L 63/104* (2013.01); *H04L 63/1416* (2013.01); *H04L 63/1466* (2013.01); *H04L 63/20* (2013.01)

(58) Field of Classification Search
CPC ........ H04L 3/102; H04L 3/0435; H04L 3/104; H04L 3/1416; H04L 3/1466; H04L 3/20
See application file for complete search history.

(56) References Cited

U.S. PATENT DOCUMENTS

| | | | | |
|---|---|---|---|---|
| 9,230,280 | B1* | 1/2016 | Maag et al. | G06Q 40/00 |
| 2011/0225076 | A1* | 9/2011 | Wang et al. | G06Q 40/00 705/35 |
| 2014/0058763 | A1* | 2/2014 | Zizzamia et al. | G06Q 10/10 705/4 |
| 2014/0237595 | A1* | 8/2014 | Sridhara et al. | G06F 21/566 709/224 |
| 2015/0033305 | A1* | 1/2015 | Shear et al. | G06F 21/6218 726/11 |
| 2015/0096023 | A1* | 4/2015 | Mesdaq et al. | G06F 21/566 726/23 |
| 2015/0188944 | A1* | 7/2015 | Dyer et al. | H04L 63/1416 726/3 |
| 2016/0021135 | A1* | 1/2016 | Chesla et al. | H04L 63/1416 726/23 |
| 2016/0021141 | A1* | 1/2016 | Liu et al. | H04L 63/1425 726/23 |
| 2016/0350359 | A1* | 12/2016 | Kim et al. | G06N 5/025 |
| 2018/0084013 | A1* | 3/2018 | Dalton et al. | H04L 63/308 |
| 2018/0091520 | A1* | 3/2018 | Camenisch et al. | H04L 9/3271 |
| 2019/0207960 | A1* | 7/2019 | Chu et al. | G06N 20/00 |

* cited by examiner

*Primary Examiner* — Badri Narayanan Champakesan
(74) *Attorney, Agent, or Firm* — Fish & Richardson P.C.

(57) ABSTRACT

Methods, systems, and apparatus, including computer programs encoded on computer storage media, for detecting fraudulent accounts. One of the methods includes obtaining raw data from network events associated with a collection of user accounts of an online service; processing the raw data including determining a feature set and applying the feature set to generate user groups each comprising one or more user account; evaluating each user group based on feature distributions including performing one or more Major-Key-Shared (MKS) correlation calculations on pairs of features from the feature set for the group; scoring each group based on the evaluation; and identifying groups having a score that exceeds a specified threshold as fraudulent.

18 Claims, 2 Drawing Sheets

DETECTING MALICIOUS USER ACCOUNTS OF AN ONLINE SERVICE USING MAJOR-KEY-SHARED-BASED CORRELATION

CROSS REFERENCE TO RELATED APPLICATIONS

This application claims the benefit under 35 U.S.C. § 119(e) of the filing date of U.S. Pat. Application No. 62/806,314, which was filed on Feb. 15, 2019, and which is incorporated here by reference.

BACKGROUND

This specification relates to online fraud detection for user accounts of an online service.

Correlation for numerical variables is a well-understood and widely-applied concept. In particular, as developed by Karl Pearson in the 1880s, the so-called "Pearson Correlation Coefficient", or correlation coefficient in short, measures a linear relationship between two variables A and B. The value of the correlation is between -1 and +1, where +1 means a complete positive linear relationship, -1 means a complete negative linear relationship, and 0 means the lack of any linear relationship. As an example, a student's score in a test tends to be positively related to the hours the student spent preparing for the test.

When it comes to discrete variables, however, there is no general consensus on the best correlation measure. Further complicating the issue, categorical variables tend to have nominal key values — meaning key values that do not have inherent ordering in them.

Although there is no common agreement on the best correlation measure for nominal categorical variables, a frequently applied correlation measure is the Chi-Squared test. The idea behind the Chi-Squared test is that if two variables are independent, the distribution of one variable will not provide information on the distribution of the other variable. In other words, for a distribution table of the two variables where each row and each column correspond to a key value, and the table element corresponds to the total number of cases for key value combinations, then knowing variable A in which row will not help predict which column variable B would belong to. This idea is formally evaluated by computing the so-called "Chi-Square Statistics" illustrated by equation 1:

$$\chi^2 = \sum \frac{(observed\ count - expected\ count)^2}{expected\ count} \quad \text{(equation 1)}$$

where the "expected count" in the table described above for a given row and column is given by:

$$expected\ count = \frac{row\ total + column\ total}{table\ total} \quad \text{(equation 2)}$$

The Chi-Square statistics thus computed are then compared to critical values from a Chi-Square distribution table to decide if the two variables are truly independent.

However, the Chi-Square statistics suffer from a problem in that it is very sensitive to sample size: it loses its accuracy when the sample size is either too large or too small, typically rendering it useless when working with millions, or even billions of data points. For example, when the sample size is too small, it could ignore a reasonably strong connection between the two variables while when the sample size is too large, it could lead to the conclusion of strong connection even if that's not the case in reality. Furthermore, the value of the Chi-Squared statistics is not bounded below 1, as would normally be expected.

Many real-world applications require working on big data sets, where having millions or billions of data points is very common. For example, with Internet technologies entering our daily lives, online fraud becomes prevalent. Fraud shows up in various areas including social networks, e-commerce, gaming, finance, and insurance. In the case of online fraud detection, systems routinely work with millions of users, and as a result, Chi-Squared statistics are not suitable for feature analysis in fraud detection.

SUMMARY

A fraud detection architecture can use an unsupervised machine learning system that can efficiently detect various malicious accounts working in scale. However, to make such a system work, a precise measure of correlation between feature pairs is needed. Chi-Square statistics are not suitable for such a purpose because of the need to compute a correlation/association relationship on a large user set, e.g., of a quarter of a million users. Using Chi-Square statistics on such a large data set typical results in many erroneous association relationships, thus polluting the fraud detection results.

To tackle this issue, this specification describes a new correlation/association measure: a Major-Key-Share-based correlation coefficient, referred to as MKS-based correlation for short. Like Chi-Square statistics, MKS-based correlation is based on the observation that if variable A and variable B are somehow connected, knowing that A takes a certain key value will give valuable information on the distribution of B. But unlike Chi-Square statistics, MKS-based correlation does not use a counting table directly. This liberates the system from the biases attached to sample sizes described above.

A key observation of MKS-based correlation is that two variables have a very strong association if one variable is generated by the other one. For example, if one variable is a client internet protocol (IP) address, "client_ip", and the other variable is the name of the city associated with such an IP address, "ip_city", then "ip_city" exhibits extremely high dependence on "client_ip" because whenever we know the key value of "client_ip", we would also know the corresponding value of "ip_city" since there is a relationship between ip address and geographic location. More formally, if we have a set of users and partition this set into smaller subsets by grouping users with the same "client_ip" into the same subset, we can determine that in each subset the value of "ip_city" will be the same across all users. If we call "client_ip" an "upstream" variable, and "ip_city" a "downstream" feature, the upstream-downstream MKS-based correlation between "client_ip" and "ip_city" is exactly one. In the absence of such perfect "generating" relationship, given any two variables with one being upstream and the other being downstream, their MKS-based correlation will be between 0 and 1.

Applying this measure in a fraud detection system can generate highly precise fraud detection results in a manner that can be more computationally efficient by identifying correlated features. In fraud detection, it is common for several features to be triggered as fraud signals all at once. As a result, separating independent alarm signals from those based on correlation is critical. Furthermore, as a general measure of association between categorical variables, MKS-based correlation can also be applied to other fields outside of fraud detection. In computer security, for example, correlation is the major approach to identify relationships among alerts. A system administrator must study if the current alert is related to previous alerts received to get the overall pattern of a potential attack. In another example, in a medical study, such as studying the effectiveness of a seasonal influenza vaccine, correlation is also needed to explore relationships between nominal measures collected to reach a conclusion.

In general, one innovative aspect of the subject matter described in this specification can be embodied in methods that include the actions of obtaining raw data from network events associated with a collection of user accounts of an online service; processing the raw data including determining a feature set and applying the feature set to generate user groups each comprising one or more user account; evaluating each user group based on feature distributions including performing one or more Major-Key-Shared (MKS) correlation calculations on pairs of features from the feature set for the group; scoring each group based on the evaluation; and identifying groups having a score that exceeds a specified threshold as fraudulent.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Performing one or more MKS correlation calculations on pairs of features from the feature set includes: determining a positive overhead for each feature; computing a pairwise MKS correlation relationship between any two features with positive overhead; and removing a contribution of one of the features from the scoring calculation if the MKS correlation relationship exceeds a specified threshold value.

Computing a pairwise MKS correlation relationship between a first feature and a second feature includes: partitioning users based on key values for the first feature; determining a proportion of users in each partition that have particular key values for the second feature; and calculating the pairwise MKS correlation between the first feature and the second feature based on the total number of partitions and the number of partitions in which the proportion of users having a particular key values for the second feature exceeds a specified threshold.

The pairwise MKS correlation is uni-directional from an upstream feature to a downstream feature. The positive overhead for a feature is a measure of the frequency of the key value for the feature in a group as compared to a global frequency. The method further includes blocking or suspending user accounts of groups identified as fraudulent.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Like reference numbers and designations in the various drawings indicate like elements.

The MKS-based correlation is a measure of a generating relationship (or the lack of it) between two categorical variables. It is not symmetric: the A → B, meaning A is upstream and B is downstream, MKS-based correlation relationship is different from the B → A MKS-based correlation relationship. As an example, assume "email_provider" is the provider derived from an email address. For example, if an email address is "JohnSmith@gmail.com", the value of "email_provider" is "gmail.com". Grouping all users by "email", the distribution of "email_provider" in any subset thus generated will have a constant distribution. This is to say that based on the major key share, the distribution of "email-provider" is a constant one. However, in the reverse direction, "email" won't all have constant distribution on groups generated by "email_provider".

Figure 1:
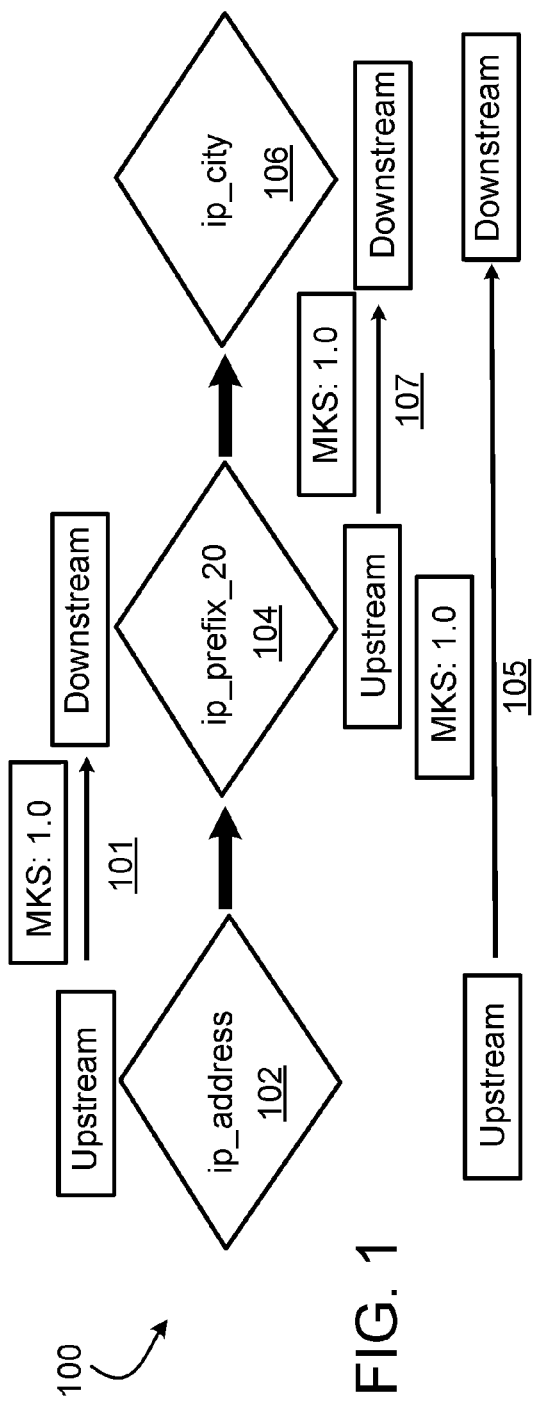
FIG. 1 is a block diagram illustrating an example generating relationship.

FIG. 1 is a block diagram 100 illustrating an example generating relationship with the corresponding upstream-downstream MKS relationships. FIG. 1 shows a first upstream-downstream relationship (101) between "ip_address" (102) and "ip_prefix_20" (104), a second upstream downstream relationship (105) between "ip_-address" (102) and "ip_city" (106) and a third upstream-downstream relationship (107) between "ip_prefix_20" (104) and "ip_city" (106). In each case illustrated in FIG. 1, the relationship is a perfect one with an upstream-downstream MKS correlation values equal to 1 in each case, indicating that the downstream variable is not independent from the upstream variable.

Definition of MKS-Based Correlation

Based on the observation above, to effectively measure the correlation between two categorical variables, e.g., A → B, a system can devise an MKS correlation as follows. First, the system partitions the universe of users by variable A. In its most simple form, the MKS correlation is:

$$MKS\ Correlation = \frac{Number\ of\ A-generated\ groups\ with\ MKS == 1}{Total\ number\ of\ A-generated\ groups}, \quad \text{(equation 3)}$$

where MKS represents major key share, or the proportion of users with the dominant key value in a group.

Figure 2:
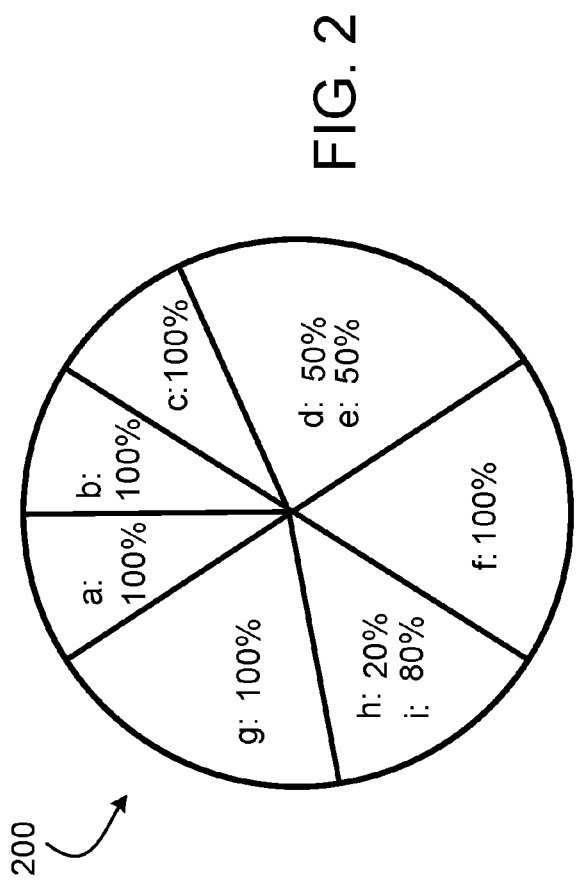
FIG. 2 shows a diagram illustrating a specific example of MKS correlation.

FIG. 2 shows a diagram illustrating a concrete example of MKS correlation.

In particular, FIG. 2 shows a diagram 200 in which feature A has seven different key values, corresponding to seven different colors in the figure. Thus, the number of A generated groups is seven. Within each group the percentage of users that also have a particular value for feature B are identified. Thus, "a: 100%" means all the users in this group has feature B's value as "a". Similarly, "d: 50%; e: 50"

means in this group about half of users has feature B's value as "d", and the other half as "e". In total, there are five of the seven groups where the percentage is 100, i.e., the MKS of that group equals 1. Thus, the MKS Correlation is:

$$MKS\ Correlation = 5/7 = 0.7143$$

When working with industry level data, it is common to have dataset that is not completely clean. Even a high quality industry-level dataset might occasionally have unreliable key values. The system can accommodate this fact with a relaxed version of MKS Correlation where instead of counting groups with MKS exactly equal to 1, the system can count groups with MKS larger than a threshold value:

$$MKS\ Correlation\ with\ Threshold = \frac{Number\ of\ A-generated\ groups\ with\ MKS > Threshold}{Total\ number\ of\ A-generated\ groups}$$ (equation 4)

Application in Fraud-Detection System

The fraud-detection system is constructed based on unsupervised machine learning. A key insight is that fraudsters rarely work alone: to make their practice economically viable, fraudsters almost always work in large scale: they create an army of fake accounts, often through some pre-written script, to conduct attacks. An automatic detection system thus groups users by carefully selected features, and conducts automatic detection at the group level by checking over all the features. For a given group, a quantity between 0 and 1, called "positive overhead" (PO in short), measures to what degree a feature would have unusually high concentration in certain key value compared to its global distribution on a randomly sampled user set. In particular, the PO is a measure of the frequency of the key value for the feature in a group as compared to the global frequency. The total badness score of this group, can be defined as a weighted sum of all the positive overhead amounts across all the features. For example, the system can generate a total score of a group expressed as:

$$totalScore = w_1 * PO\_ip + w_2 * PO\_ip\_prefix\_20 + w_3 * PO\_user\_agent + w_4 * PO\_device\_id$$ (equation 5)

where each w is a respective weight and $PO_i$ describes the calculated positive overhead for feature i.

However, due to the correlation relationship between some features, such as that between "ip" and "ip_prefix_20" above, this simple summation leads to instances of double counting: the system is counting the contribution of both feature "ip" and "ip_prefix_20" to the total score, while in reality both correspond to the fact that most of users in that group comes from the same IP address. If the system has other features such as "ip_city" and "ip_country", they would also have positive overhead and thus be counted into the total score. As a result, the calculated total score can be skewed higher than it should be, which can lead to more groups being identified as having fraudulent accounts than should be.

MKS correlation is the key in solving this issue of "double counting". The system can check the pairwise correlation relationship between any two features with a non-zero positive overhead for a given group. The weight values can be selected to determine the significance of a given PO value. If their MKS correlation is larger than a specified threshold, e.g., 0.85, the system can eliminate the downstream feature from the total score calculation. In the example above, given that "ip" → "ip_prefix_20" has an MKS correlation of 1.0, "ip_prefix_20" will be eliminated and the total score becomes:

$$totalScore = w_1 * PO\_ip + w_3 * PO\_ip\_user\_agent + w_4 * PO\_device\_id$$ (equation 6)

Here MKS Correlation allows the detection system to successfully filter out correlated features, thus avoid double counting. Moreover, this technique could also be used in many other fields such as finance and medicine, where studying the relationship between categorical features is necessary.

Figure 3:
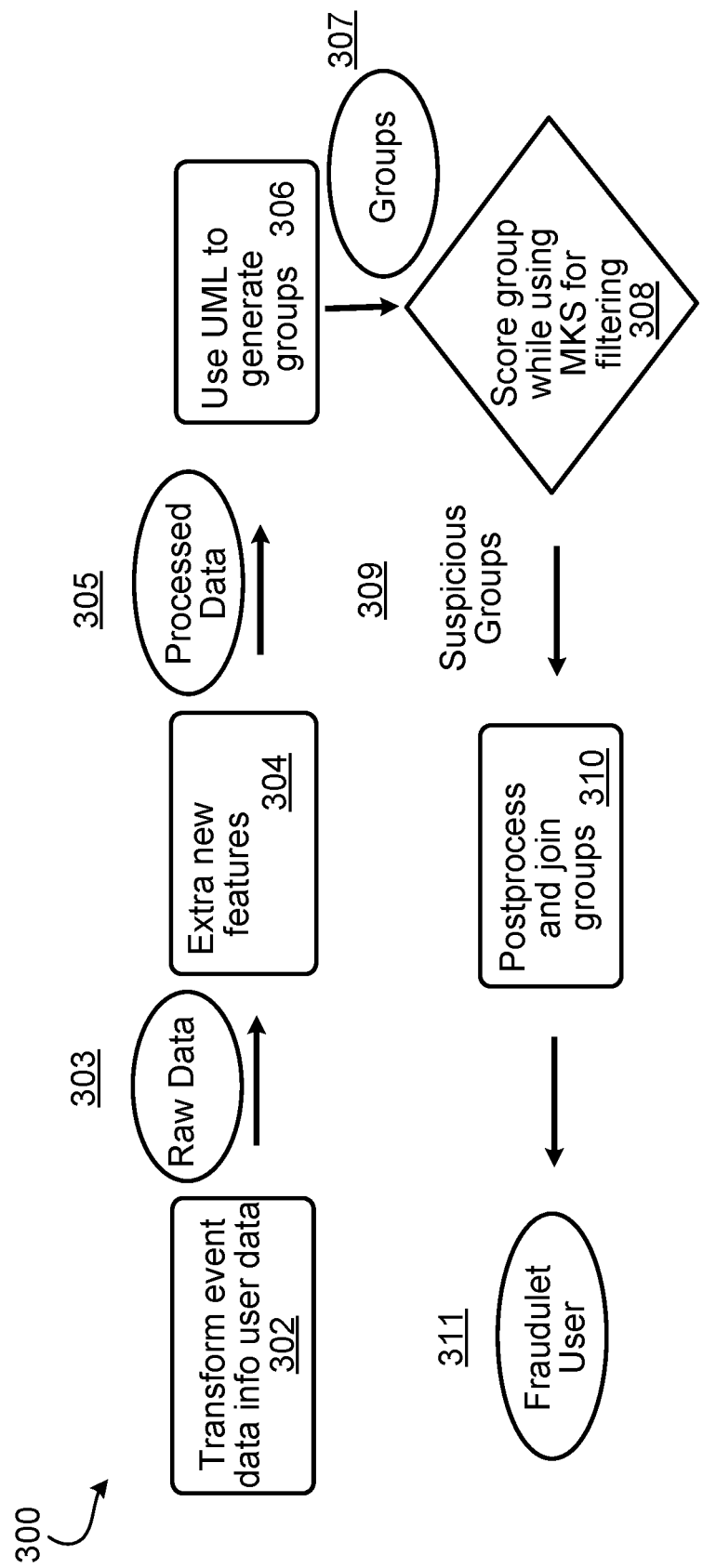
FIG. 3 is an operational flow diagram that shows an example fraud detection process including MKS correlation.

In a broader context, MKS Correlation works as a gatekeeper in a fraud detection system in production, as illustrated by FIG. 3.

FIG. 3 is an operational flow diagram 300 that shows an example fraud detection process including MKS correlation. The fraud detection process can be performed by a fraud detection system. The fraud detection system can start from raw data (303) of millions and even billions of user accounts. The raw data is generated by transforming event data into user data (302). Features associated with the raw data are identified (304). Based on the raw features associated with each account in the raw data, the system can then extract features using a predefined feature library. The resulting feature set can include both raw features from individual accounts as well as additional features from the feature library based on those raw features. The resulting feature set, processed data (305) is used by an unsupervised machine learning system (UML) (306) to generate user groups (307).

Each generated user group is carefully examined by the UML algorithm based on its features' distributions. As described above, this is where MKS comes into play for fraud detection. When computing a total suspiciousness score for each group (308), MKS can effectively tease out correlated features and therefore avoid double counting and increase the accuracy of the total score. If after filtering with MKS Correlation, a group's score still exceeds a certain threshold, the detection system deems this group suspicious (309). All suspicious groups are subject to further post processing, and afterwards will be joined together (310). Any user account in the joined set will be detected as fraudulent user (311). Each user's badness score is the highest group score among all the bad groups he belongs to. Actions can be taken against fraudulent user accounts including, for example, blocking access by the account to a particular online service or suspending the account pending human administrator follow-up.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or electronic system that may include one or more processing devices and memory to store executable instructions to perform the operations described in this specification.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
    obtaining raw data from network events associated with a collection of user accounts of an online service;
    processing the raw data including determining a feature set and applying the feature set to generate user groups each comprising one or more user account;
    evaluating each user group based on feature distributions comprising:
        determining a positive overhead for each feature of the feature set; and
        computing a pairwise Major-Key-Shared (MKS) correlation relationship between respective pairs of features of the features for the group having a positive overhead, wherein the MKS correlation is a measure of a relationship between the individual features of the pair of features having nominal key values, and wherein computing the pairwise MKS correlation relationship for a pair of features comprises: partitioning the users of the user group by values of the first feature of the pair of features and then calculating a proportion of the partitions in which the second feature for users in the partition has a particular value;
    scoring each group based on the evaluation including weighting or removing one or more features when calculating the score for the group according to the calculated MKS correlations between pairs of features of the feature set; and
    identifying groups having a score that exceeds a specified threshold as fraudulent.

2. The method of claim 1, wherein performing one or more MKS correlation calculations on pairs of features from the feature set further comprises:
    removing a contribution of one of the features from the scoring calculation if the MKS correlation relationship exceeds a specified threshold value.

3. The method of claim 2, wherein computing a pairwise MKS correlation relationship between a first feature and a second feature comprises:
    partitioning users based on key values for the first feature;
    determining a proportion of users in each partition that have particular key values for the second feature; and
    calculating the pairwise MKS correlation between the first feature and the second feature based on the total number of partitions and the number of partitions in which the proportion of users having a particular key values for the second feature exceeds a specified threshold.

4. The method of claim 2, wherein the pairwise MKS correlation is uni-directional from an upstream feature to a downstream feature.

5. The method of claim 2, wherein the positive overhead for a feature is a measure of the frequency of the key value for the feature in a group as compared to a global frequency.

6. The method of claim 1, further comprising:
    blocking or suspending user accounts of groups identified as fraudulent.

7. A system comprising:
    one or more computers and one or more storage devices storing instructions that are operable, when executed by the one or more computers, to cause the one or more computers to perform operations comprising:
        obtaining raw data from network events associated with a collection of user accounts of an online service;
        processing the raw data including determining a feature set and applying the feature set to generate user groups each comprising one or more user account;
        evaluating each user group based on feature distributions comprising:
            determining a positive overhead for each feature of the feature set; and
            computing a pairwise Major-Key-Shared (MKS) correlation relationship between respective pairs of features of the features for the group having a positive overhead, wherein computing the pairwise MKS correlation relationship for a pair of features comprises: partitioning the users of the user group by values of the first feature of the pair of features and then calculating a proportion of the partitions in which the second feature for users in the partition has a particular value;
        scoring each group based on the evaluation including weighting or removing one or more features when calculating the score for the group according to the calculated MKS correlations between pairs of features of the feature set; and
        identifying groups having a score that exceeds a specified threshold as fraudulent.

8. The system of claim 7, wherein performing one or more MKS correlation calculations on pairs of features from the feature set further comprises:
    removing a contribution of one of the features from the scoring calculation if the MKS correlation relationship exceeds a specified threshold value.

9. The system of claim 8, wherein computing a pairwise MKS correlation relationship between a first feature and a second feature comprises:
    partitioning users based on key values for the first feature;
    determining a proportion of users in each partition that have particular key values for the second feature; and
    calculating the pairwise MKS correlation between the first feature and the second feature based on the total number of partitions and the number of partitions in which the proportion of users having a particular key values for the second feature exceeds a specified threshold.

10. The system of claim 8, wherein the pairwise MKS correlation is uni-directional from an upstream feature to a downstream feature.

11. The system of claim 8, wherein the positive overhead for a feature is a measure of the frequency of the key value for the feature in a group as compared to a global frequency.

12. The system of claim 7, wherein the instructions are operable, when executed by the one or more computers, to cause the one or more computers to perform operations further comprising:
    blocking or suspending user accounts of groups identified as fraudulent.

13. One or more non-transitory computer-readable storage media encoded with instructions that, when executed by one or more computers, cause the one or more computers to perform operations comprising:
    obtaining raw data from network events associated with a collection of user accounts of an online service;
    processing the raw data including determining a feature set and applying the feature set to generate user groups each comprising one or more user account;
    evaluating each user group based on feature distributions comprising:
        determining a positive overhead for each feature of the feature set; and
        computing a pairwise Major-Key-Shared (MKS) correlation relationship between respective pairs of features of the features for the group having a positive overhead, wherein computing the pairwise MKS correlation relationship for a pair of features comprises: partitioning the users of the user group by values of the first feature of the pair of features and then calculating a proportion of the partitions in which the second feature for users in the partition has a particular value;
    scoring each group based on the evaluation including weighting or removing one or more features when calculating the score for the group according to the calculated MKS correlations between pairs of features of the feature set; and
    identifying groups having a score that exceeds a specified threshold as fraudulent.

14. The computer-readable storage media of claim 13, wherein performing one or more MKS correlation calculations on pairs of features from the feature set further comprises:
    removing a contribution of one of the features from the scoring calculation if the MKS correlation relationship exceeds a specified threshold value.

15. The computer-readable storage media of claim 14, wherein computing a pairwise MKS correlation relationship between a first feature and a second feature comprises:
    partitioning users based on key values for the first feature;
    determining a proportion of users in each partition that have particular key values for the second feature; and
    calculating the pairwise MKS correlation between the first feature and the second feature based on the total number of partitions and the number of partitions in which the proportion of users having a particular key values for the second feature exceeds a specified threshold.

16. The computer-readable storage media of claim 14, wherein the pairwise MKS correlation is uni-directional from an upstream feature to a downstream feature.

17. The computer-readable storage media of claim 14, wherein the positive overhead for a feature is a measure of the frequency of the key value for the feature in a group as compared to a global frequency.

18. The computer-readable storage media of claim 13, wherein the instructions further cause the one or more computers to perform operations comprising:
    blocking or suspending user accounts of groups identified as fraudulent.

* * * * *